(12) United States Patent
Zahoransky et al.

(10) Patent No.: US 8,607,398 B2
(45) Date of Patent: Dec. 17, 2013

(54) DEVICE FOR THE PRODUCTION OF BRUSHES AND BRUSH

(75) Inventors: Ulrich Zahoransky, Freiburg (DE); Reinhard Schnurr, Munstertal (DE)

(73) Assignee: Zahoransky Formenbau GmbH, Freiburg (DE)

( * ) Notice: Subject to any disclaimer, the term of this patent is extended or adjusted under 35 U.S.C. 154(b) by 0 days.

(21) Appl. No.: 13/226,587

(22) Filed: Sep. 7, 2011

(65) Prior Publication Data

US 2012/0060308 A1 Mar. 15, 2012

(30) Foreign Application Priority Data

Sep. 9, 2010 (DE) .................. 10 2010 044 921

(51) Int. Cl.
*A46B 3/18* (2006.01)
(52) U.S. Cl.
USPC ........................................... 15/206; 132/218
(58) Field of Classification Search
USPC ............................................ 15/206; 132/218
See application file for complete search history.

(56) References Cited

U.S. PATENT DOCUMENTS

| 4,733,425 | A | * | 3/1988 | Hartel et al. ........................ 15/206 |
| 5,699,578 | A | * | 12/1997 | Dumler et al. .................... 15/167.1 |
| 7,051,740 | B2 | * | 5/2006 | Montoli et al. ................ 132/218 |
| 7,172,357 | B2 | * | 2/2007 | Gueret ........................... 401/129 |
| 7,487,784 | B2 | * | 2/2009 | Gueret ........................... 132/218 |
| 7,832,954 | B2 | * | 11/2010 | Gueret ........................... 401/129 |
| 7,913,701 | B2 | * | 3/2011 | Dieudonat .................... 132/218 |
| 7,946,778 | B2 | * | 5/2011 | Gueret ........................... 401/129 |
| 8,001,980 | B2 | * | 8/2011 | Lhoyer et al. ................. 132/218 |
| 2002/0195117 | A1 | * | 12/2002 | Bailly ........................... 132/218 |
| 2003/0084913 | A1 | * | 5/2003 | Gueret ........................... 132/218 |
| 2004/0134507 | A1 | * | 7/2004 | Gueret ........................... 132/218 |
| 2004/0237989 | A1 | * | 12/2004 | Montoli ........................ 132/218 |
| 2008/0041407 | A1 | * | 2/2008 | Kearney ....................... 132/218 |
| 2010/0192968 | A1 | * | 8/2010 | Gueret ........................... 132/200 |

FOREIGN PATENT DOCUMENTS

DE 103 28 445 A1 1/2005
JP 09168426 * 9/1997

OTHER PUBLICATIONS

Translation of Japanese Publication Jul. 9, 2012.*

* cited by examiner

*Primary Examiner* — Monica Carter
*Assistant Examiner* — Michael Jennings
(74) *Attorney, Agent, or Firm* — Volpe and Koenig, P.C.

(57) ABSTRACT

A device (17) for the production of brushes (1, 1*a*) that have a twisted carrier part (3) made from wire sections (2) with a set of bristles (4) and a handle-side and/or a head-side overmolding (5, 6) has an injection molding tool for holding and for the overmolding of the head-side or handle-side end region of a brush pre-form (32). The tool has a mold part (33) with a passage (13) for the end region. In this way, a mechanism (20) for the attachment or introduction of a sealing element (7) is provided on the carrier part (3), wherein this sealing element (7) is arranged in the region of the passage (13) for the overmolding and seals this passage.

8 Claims, 3 Drawing Sheets

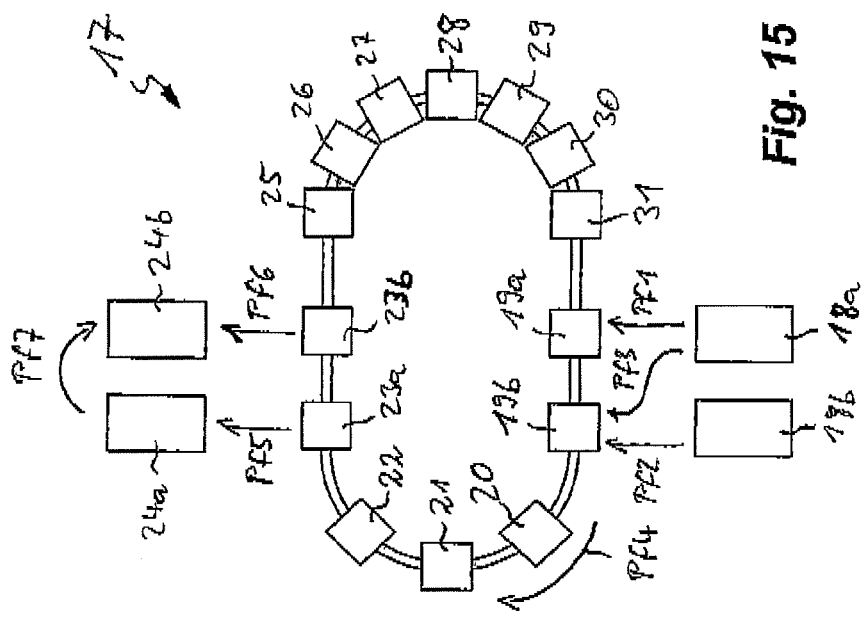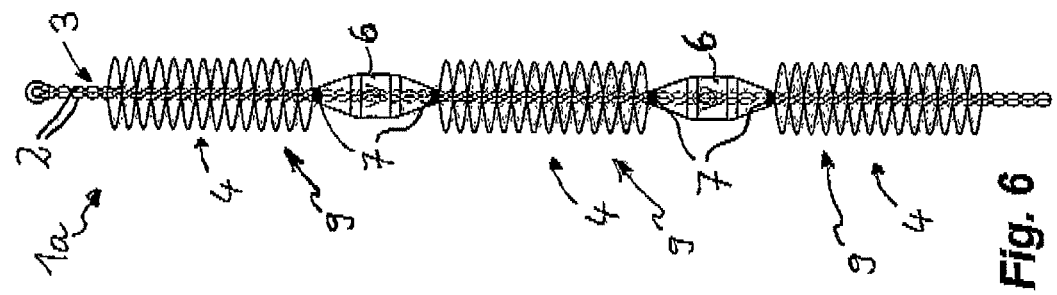

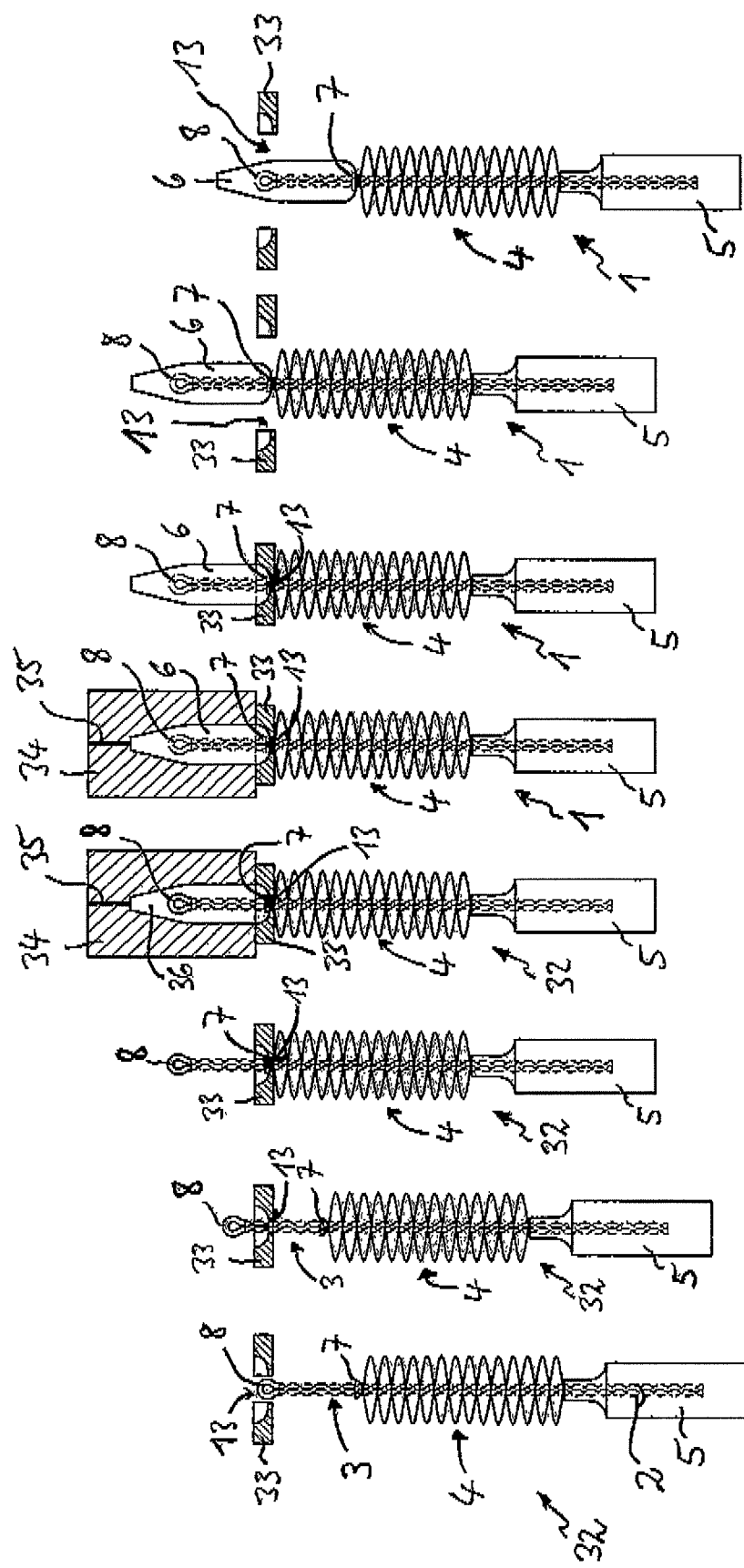

DEVICE FOR THE PRODUCTION OF BRUSHES AND BRUSH

CROSS-REFERENCE TO RELATED APPLICATIONS

This application claims the benefit of German Patent Application No. 10 2010 044 921.0, filed Sep. 9, 2010, which is incorporated herein by reference as if fully set forth.

BACKGROUND

The invention relates to a device for the production of brushes that have a twisted carrier part made from wire sections with a set of bristles and a handle-side and/or a head-side overmolding, with an injection molding tool for holding and for overmolding of the head-side or handle-side end region of a brush pre-form, wherein this tool has a mold part with a passage for the end region.

Such twisted brushes are used, for example, as inter-dental brushes, mascara brushes, or in the medical industry. These have wire sections with a diameter in the range of approximately 0.17 mm to 0.4 mm. During their production, the bristles are first twisted in the wire sections. This brush pre-form provided with bristles is then introduced with its bristle-less head or end region into an injection molding tool, wherein a brush handle or a head-side overmolding is molded. Here it is problematic that the passage must have dimensions that are large enough to be able to insert the carrier part that could have certain tolerances in its dimensions, so that, between the passage and the wire of the carrier part, an intermediate space remains through which injection material can penetrate outward when the injection pressure is too high. Thus, it can be processed only with low injection pressure, wherein, however, the retaining force between the injection-molded end area of the brush and the injection-molded plastic material is limited.

From DE 103 28 445 A1, a device is already known in which the passage between an injection position holding the carrier part of the brush in a clamping and essentially sealing manner and an insertion and removal position releasing the carrier part is variable with an opening cross section enlarged relative to the opening cross section in the injection position. Therefore, the injection pressure can indeed be increased, but cavities still remain between the twisted wire sections and the passage, so that the injection pressure is further limited. Especially for larger brushes, such as pipe-cleaning brushes, for example, for cleaning firearms, pipes, or chimneys, or for bottle-cleaning brushes, but also for larger mascara brushes or certain medical brushes, these cavities are relatively large due to the thickness of the wire sections, so that, in turn, processing can be performed only with low injection pressure.

SUMMARY

Therefore, the objective is to provide a device of the type noted above with which larger, twisted brushes can also be manufactured, without injection material penetrating outward during the injection of the overmolding and in which, nevertheless, a high retaining force between the carrier part and the overmolding is given.

The solution according to the invention for meeting this objective is that a device is provided for attaching or inserting a sealing element on the carrier part, wherein this sealing element is arranged in and seals the area of the passage during the overmolding. Through this sealing element, cavities produced by tolerances and the twisted wire shape between the carrier part and the mold part with the passage are sealed and it can be processed during injection of the overmolding with high injection pressures, without injection material reaching outward through the passage. In this way, the retaining force between the carrier part and the overmolding is also simultaneously improved.

The device for attaching or inserting a sealing element can be constructed for shortening the bristle filaments of the set of bristles turned toward the overmolding to be attached and the sealing element is here formed by the shortened bristle filaments. For the insertion of the carrier part into the passage or for the adjustment of the passage into its injection position in the case of an adjustable passage, the shortened bristle filaments are placed in the cavities between the wire section and the passage and are in this way compressed, so that the cavities are closed and also for high injection pressure, no injection material can reach outward into the area of the set of bristles.

A different embodiment provides that the device for attaching or inserting a sealing element is constructed for attaching a sealing band onto the carrier part in the area of the bristle filaments of the set of bristles turned toward the overmolding to be attached. This sealing band could be made from textile material or from plastic and can be dimensioned according to the respective geometries.

Another embodiment provides that the device for attaching a sealing ring is constructed with two passage openings for the two wire sections on the carrier part before the twisting of the wire sections with each other. This sealing ring is then fixed onto the wire sections together with the bristle filaments during the twisting of the wire sections, wherein cavities in the area of the wire sections are avoided. The outer diameter of the sealing ring is adapted to the cross section of the passage of the mold part, so that a tight bearing is likewise made possible here.

Another variant provides that the device is constructed for attaching or inserting a sealing element for attaching a sealing ring on the carrier part from the mold side after the carrier part passes through the passage of the mold part. Such a sealing ring is pressed against the passage by the injection pressure during the injection of the overmolding, so that the elastic sealing ring is pressed into the cavities between the sealing ring and the carrier part and the cavities are thus closed.

Finally, it is also possible that the device for attaching or inserting a sealing element is constructed for attaching lacquer to the carrier part as a sealing element. With a quick-drying lacquer that is still elastic even in the solidified state, a sealing ring can likewise be formed that is pressed into the cavities in the injection position and seals the passage.

For a simple insertion of the carrier part in the mold and a removal of the insert-molded carrier part from the mold, it is useful if the passage can be changed between an injection position holding the sealing element in a clamping and sealing manner and an insertion and removal position releasing the sealing element with an opening cross section that is enlarged relative to the opening cross section in the injection position.

It can be useful if the passage has a conical inner wall expanding in the direction toward the mold cavity. If the sealing element is a sealing ring with a corresponding outer counter profiling, then the sealing element is pressed by the injection pressure onto the carrier part and the seal between the carrier part and the sealing element is thus further increased.

One advantageous embodiment provides that a holder is provided for the carrier part, wherein this holder has a rotary drive for a rotational movement of the carrier part when passing through the passage. In this way, the sealing element can be better placed in the cavities of the twisted wire sections and could seal these sections, especially if it involves bristle filaments or a sealing band. The rotational direction of the rotary drive is here preferably adapted to the twisting direction of the wire sections.

For the simultaneous processing of the several brushes, the mold part can be a multiple mold part with several passages for the simultaneous processing of several carrier parts. In this way, the production rate can be increased.

A further concept of the invention provides that an injection device is provided for overmolding of a section not provided with bristles between two sections of the carrier part provided with bristles, wherein this section not provided with bristles has a mold part with two passages for holding the carrier part section for overmolding. In this way, for example, longer pipe-cleaning brushes can be produced that have several sections that are provided with bristles and between each of which a section is provided that is not provided with bristles, so that the brush can be guided more easily through bent pipes. The overmolding here prevents too acute of a bending of the sections that are not provided with bristles, which could have the result that the free wire sections reach and damage the inside of the pipe or the sections provided with bristles do not completely contact the inside of the pipe and perform only an inadequate cleaning. In this way, cavities in the area of the wire sections of the carrier part are also sealed by sealing elements in the way described above, so that processing can also be performed here at a high injection pressure.

The invention also relates to a brush that has a twisted carrier part made from wire sections with a set of bristles and a handle-side and/or a head-side overmolding.

The brush according to the invention is therefore characterized in that a sealing element is provided on the end area of the handle-side and/or the head-side overmolding turned toward the set of bristles. This produces the advantages described above for the production of the brush. In addition, through the possibly higher injection pressure, the retaining force between the carrier part and injection molding is increased, so that an inadvertent detachment of the carrier part from the overmolding is avoided, for example, when cleaning teeth with interdental brushes.

The sealing element can be formed here by shortened bristle filaments, could be a sealing band attached to the carrier part or a sealing ring, or could be formed by lacquer deposited on the carrier part. The sealing element can be adapted optimally to each of the cavities and seal these cavities due to its elasticity and deformability.

A sealing band can preferably have a conical shape in the insertion direction, so that a simple insertion is possible into the passage and a good sealing is guaranteed.

In the case of a sealing ring, it is useful if this has a conical end area with run-on bevels widening from the end turned toward the overmolding in the direction toward the set of bristles. These run-on bevels are loaded by the injection pressure during the injection of the injection material and in this way compressed in the direction toward the carrier part, wherein the sealing ring is better pressed into the cavities and seals these cavities.

It is also possible that the sealing ring has a transition region widening in the direction toward the set of bristles on the inside of its passage opening for the carrier part. Thus, in the transition area between the overmolding and the set of bristles, there are no sharp edges and the risk of fracture of the carrier part due to frequent bending is reduced. The transition region can have a conical profile, can be formed by a rounded section, or could be formed by stepped drilled holes with different diameters.

It can also be useful if the sealing ring has, on the outside, a conical section tapering in the direction toward the set of bristles. This section can be arranged in a corresponding, counter-contoured area of the passage, so that, during the injection, the injection material loads the sealing ring by the injection pressure and compresses it inward and thus the cavities in the area of the carrier part are better sealed.

The wire sections of the carrier part and/or the sealing element can be provided with a coating for an optimized connection to the injection material of the overmolding.

The head-side overmolding could be constructed like a brush. Thus, for example, a more complex mascara brush can be produced with a brush area made from bristle filaments and a brush area made from plastic. The end-side area of the head-side overmolding here advantageously has a short and rounded construction, so that, on one hand, the plastic filaments can penetrate as deeply as possible into the mascara holder, in order to still be able to hold material even for a nearly empty container and, on the other hand, the risk of injury by the rounded, free end is minimized when handling the brush around the eye.

A further concept of the invention provides that an anti-twist mechanism is provided in the insert-molded area of the carrier part.

The anti-twist mechanism is used for improving the hold between the carrier part and overmolding and prevents a detachment of the carrier part from the overmolding, as well as a relative movement, especially a rotation, between the two parts.

The anti-twist mechanism can be formed, in the simplest case, by a bending or crimping of the wire sections.

The anti-twist mechanism can also be formed by an eyelet-shaped bending of the wire sections. For single-part production of the brushes, a wire is typically unwound from a roll, cut to length accordingly, and folded in the center. Bristle filaments are placed between the wire sections formed in this way and the wire sections are twisted with each other. The position of the bend could be widened to form an eyelet or the eyelet shape could be formed directly during the folding. Through the enlarged cross section formed in this way, the carrier part is connected better to the insert-molded plastic material after the overmolding.

A preferred embodiment provides that the anti-twist mechanism can be formed by bristle filaments twisted between the wire sections. These can be twisted together with the bristle filaments of the set of bristles and then shortened, because the injection molding typically should not project past the set of bristles. Through the bristle filaments, a large contact face is produced with the insert-molded plastic material, so that a good anti-twist mechanism and correspondingly high retaining forces can be achieved. The bristle filaments used as the anti-twist mechanism could be arranged on only one sub-section of the insert-molded end area of the carrier part or a gap-less sequence of bristle filaments for the set of bristles can be provided for the sealing element and for the anti-twist mechanism.

It is also conceivable that a plastic band or a textile band is attached onto the carrier part as an anti-twist mechanism, like for the sealing.

The overmolding can also have a multicolor construction in that multiple components are injected one after the other.

Additional functional elements can also be injection molded on or in the part, for example, RFID transponders for exact position locating, which can be useful, for example, for pipe-cleaning brushes. The functional elements can also be attached to the wire sections before the injection molding, in order to improve their holding. Attachment can be realized here, in particular, in the case of wire sections with an eyelet.

The overmolding can also be constructed in the form of a sponge for storing liquids, for example, as a reservoir for cleaning agents that are discharged uniformly when the brush is used, or in the medical industry for medicines or contrast agents.

The overmolding can also be clipped or injection molded onto a package for the brush, in order to form a tamper-proof package.

The size of the overmolding is oriented according to the type of plastic material used for the overmolding. In the case of hard plastic, a smaller, shorter overmolding is sufficient, in order to achieve a desired retaining force between the carrier part and overmolding. In the case of softer plastic, the overmolding should have a larger length.

BRIEF DESCRIPTION OF THE DRAWINGS

Below, embodiments of the device according to the invention and the brush are explained in detail with reference to the drawings.

Shown are:

FIG. 6 is a view of several twisted brushes connected to each other, FIG. 7 is a top view of a sealing ring with two passage openings, FIG. 8 is a side section diagram of the sealing ring according to FIG. 7, FIG. 9 is a top view of a sealing ring with a passage opening, FIG. 10 is a side section diagram of the sealing ring according to FIG. 9, FIG. 11 is a top view of a sealing ring with run-on bevels for the injection material, FIG. 12 is a side section diagram of the sealing ring supported in a mold part with a passage from FIG. 11, FIG. 13 is a top view of a sealing ring with a section tapering in the direction toward the set of bristles, FIG. 14 is a side section diagram of the sealing ring supported in a mold part with a passage from FIG. 14, brushes, and FIG. 16 to FIG. 23 are views illustrating the individual steps for the attachment of an overmolding on the carrier part of a brush pre-form.

DETAILED DESCRIPTION OF THE PREFERRED EMBODIMENTS

Figure 1:
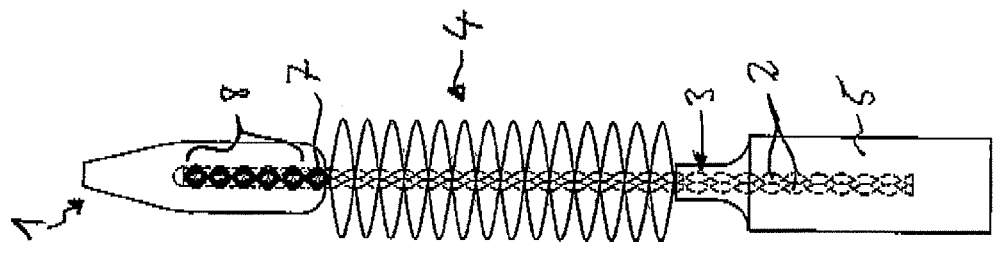
FIG. 1 to FIG. 5 each show a view OF a brush with a handle-side and a head-side overmolding.

Each brush designated overall with 1 has, according to FIGS. 1 to 5, a twisted carrier part 3 made from wire sections 2 with a set of bristles 4. In the lower area, the brush 1 has a handle 5 molded in the conventional way.

In the area of a head-side overmolding 6, a sealing element 7 and an anti-twist mechanism 8 are provided. The sealing element 7 is used for the injection of the head-side overmolding 6 such that processing can be performed at a high injection pressure, without injection material being discharged outward from the injection molding mold and being able to reach into the area of the set of bristles 4, in that the sealing element 7 seals the cavities in the area of the twisted wire sections 2 and also between the wire sections 2 and the passage 13 of the injection molding mold (FIGS. 18-21).

The anti-twist mechanism 8 has the function of increasing the retaining forces between the insert-molded area of the carrier part 3 and the overmolding 6, so that rotation of the two elements relative to each other and also peeling of the overmolding 6 from the carrier part 3 can be prevented.

The head-side overmolding 6 and also the handle 5 could be made, for example, from TPE plastic.

For the brush 1 according to FIG. 1, the sealing element 7 is formed by a sealing band attached to the carrier part 3. This sealing band could be made from plastic or from textile material and could be wound around the carrier part 3. Due to its elasticity, it fills the cavities in the area of the wire sections 2 in a sealing manner when it is held, for example, in a clamping manner in the passage 13 of the mold part 33 of the injection molding mold.

The anti-twist mechanism 8 for the brush 1 according to FIG. 1 is formed by an eyelet. This is formed by a corresponding bending of a wire for the formation of the two wire sections 2.

Figure 2:
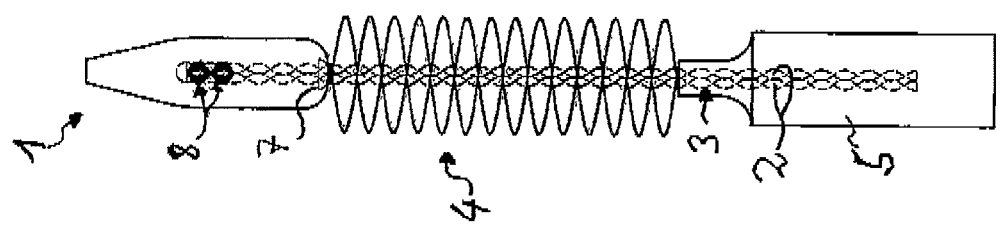

For the brush 1 according to FIG. 2, the sealing element 7 is formed by shortened bristle filaments. These could also be placed easily into the cavities of the carrier part 3 and thus provide for a good sealing between the carrier part 3 and the passage 13 of the mold part 33 of the injection molding mold during the injection of the head-side overmolding 6. For the production of the brush, initially bristle bundles that are dimensioned according to the bristle bundle of the set of bristles 4 can be twisted that are then cut to length by a device for shortening the bristle filaments and thus form the sealing element 7. The anti-twist mechanism 8 is also formed here by an eyelet.

Figure 3:
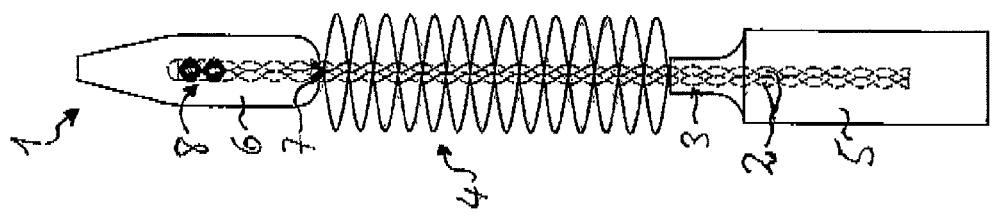

In contrast, for the brush 1 according to FIG. 3, the anti-twist mechanism 7 and also the sealing element 7 are likewise formed by shortened bristle filaments in the end area of the insert-molded area of the carrier part 3. In this way, a large contact face is produced between the bristle filaments and the injection material, so that an especially good holding of the overmolding 6 on the carrier part 3 is achieved.

Figure 4:
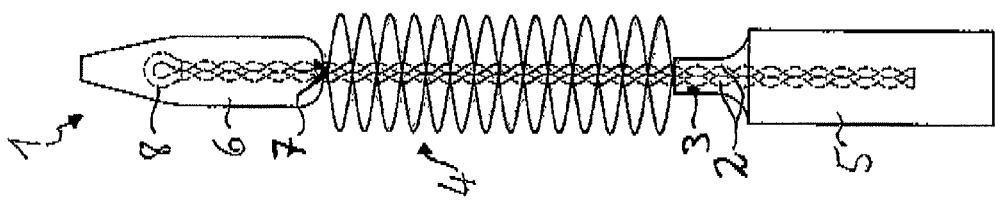

FIG. 4 shows a variant of a brush 1 in which the sealing element 7 is formed by a sealing band and the anti-twist mechanism 8 is formed by shortened bristle filaments.

Figure 5:
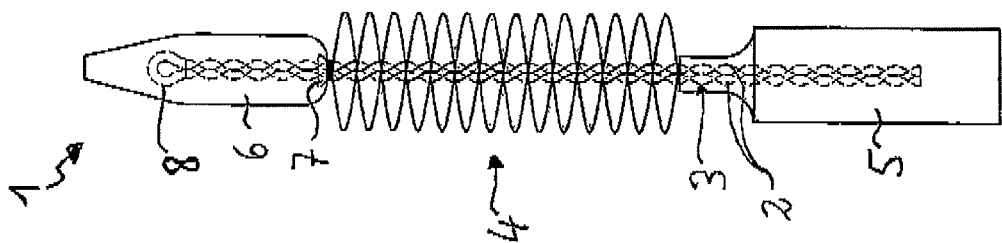

For the brush 1 according to FIG. 5, the entire insert-molded area of the carrier part 3 is provided with shortened bristle filaments. The bristle bundle lying closest to the set of bristles 4 here forms the sealing element 7 and the bristle bundles lying above form the anti-twist mechanism 8.

FIG. 6 shows a brush 1a in which several sub-brushes 9 are connected to each other. Each of the sub-brushes 9 has a set of bristles 4 and sections of the carrier part 3 not provided with bristles adjacent to this set of bristles. The wire sections 2 facing each other of the sections of the carrier parts 3 not provided with bristles are each connected to each other and provided with an overmolding 6. Here, sealing elements 7 are also provided on the ends of the sets of bristles 4 and each of these sealing elements seals a passage of an injection molding mold constructed corresponding to the holder of the wire sections between the sets of bristles.

Such a brush 1a, as shown in FIG. 6, can be used, for example, as a pipe-cleaning brush. The overmolding 6 here forms, on one hand, a bending protection, in order to prevent a breakage of the wire sections when the brush 1a passes through bent pipe sections and, on the other hand, it also acts as protection for the inner walls of the pipe from damage due to loading by the wire sections as such.

A brush 1a according to FIG. 6 could be produced by assembling individual brushes or the production is carried out in an endless production in which wire is unwound from two rolls, the bristle filaments are placed in the desired areas, and the wires are twisted with the filaments. Then the twisted brush section is moved forward and another section can be processed.

Each of FIGS. 7 to 14 shows a sealing element 7 constructed as an elastic sealing ring.

The sealing element 7 according to FIGS. 7 and 8 has two passage openings 10 for the individual wire sections 2 of the carrier part 3 not shown in the figures. This sealing element 7 is placed on the wire sections before the twisting of the wire sections 2 and the wire sections 2 are then twisted with each other. The diameters of the passage openings 10 are here adapted to the diameters of the wire sections, wherein the cavities in the area of the wire sections are sealed.

The sealing element 7 according to FIGS. 9 and 10 has a single passage opening 10 with which the sealing element 7 is set on the carrier part 3 after twisting of the wire sections 2 with each other. The diameter of the passage opening 10 is here adapted to the outer periphery of the carrier part 3. The cavities are reliably sealed by the pressurization by the mold part 33 having the passage 13 and the elasticity of the sealing element 7.

The sealing element 7 according to FIGS. 11 and 12 is likewise set with its passage opening 10 on the carrier part 3. With a sub-area, the sealing element 7 is supported during the injection in the passage 13 of the mold part 33 of the injection molding mold (FIG. 12). On its end area 11 turned toward the injection molding mold during injection, the sealing element 7 has run-on bevels 12 that are loaded by the injection pressure of the injection material during injection and the sealing element 7 is therefore deformed elastically and pressed into the cavities of the wire sections and these are thus sealed.

A similar loading of the sealing element 7 by the injection material during the injection of the overmolding is carried out for the sealing element according to FIGS. 13 and 14. The sealing element 7 here has, on the outside, a conical section 14 tapering in the direction toward the set of bristles. This section is supported in the passage 13 (FIG. 14) that has a corresponding, counter-contoured inner wall 15. In this way, the sealing element 7 is likewise compressed during the injection and the material is set in the cavities of the carrier part and seals these cavities.

The sealing element 7 according to FIG. 12 still has, on the inside of its passage opening 10 for the carrier part, a transition area 16 expanding in the direction toward the set of bristles. This bevel is used for the finished brush as protection against breakage of the wire sections for frequent back and forth movement of the plastic material, because thus the wire sections are not guided around a sharp edge.

FIG. 15 shows schematically a device 17 for the production of brushes 1 with different processing stations. At the bristle-providing stations 18a, 18b, the bristle bundles are twisted between the wire sections and the sets of bristles are generated in this way. The brush pre-forms provided with bristles are moved according to the arrows Pf1, Pf2 to provision stations 19a, 19b, where each of them is inserted into a passage of a mold part. To compensate for different processing rates, a transition from the bristle-providing station 18a to the provision station 19b can also be carried out (Pf3).

In the transport direction (PF4), a device 20 attaches for the attachment or insertion of a sealing element. Here, a sealing element, especially a sealing ring, can be fixed on the carrier part. It is also possible that the device 20 is arranged directly after the bristle-providing stations 18a, 18b, especially if the device 20 for attaching or inserting a sealing element is constructed for shortening bristle filaments as a sealing element.

At an inspection station 21, the brush pre-form can be inspected for damage and correct positioning of the sealing element, for example, by a camera.

A handle-forming station 22 could be optionally provided at which handles could be attached to one side of the brush performs in a conventional way. Such a handle-forming station, however, could also be arranged, if necessary, for reasons of space, after the injection-molding devices 24a, 24b (handle-forming station 25).

At two transfer stations 23a, 23b, the prepared brush pre-forms can be transferred to an injection molding device 24a, 24b, respectively (arrows Pf5, Pf6). One of the injection molding devices could be constructed, for example, for the injection molding of a handle and the other injection molding device could be constructed for the injection molding of a head-side overmolding. The transfer from one injection molding device 23a to the next injection molding device 23b could also be carried out directly (arrow Pf7), without which the partially injected brush is initially transferred back to the next transfer station 23a and from there forwarded to the next transfer station 23b. The use of only a single injection molding device on which the injection molding of the handle and also the head-side overmolding are carried out is also conceivable.

The injection molding devices 24a, 24b could inject injection material of different colors. It is also conceivable that each of the injection molding devices 24a, 24b is constructed for the injection molding of plastic material in several colors.

Consequently, additional, known processing stations are connected, for example, a connection device 26 for connecting the brush to a covering cap or a colored marking ring, a device 27 for attaching a marking, a recess or a coding, a bending device 28 for bending the brush, especially in the area of the set of bristles, a cleaning station 29, a final inspection device 30, and a removal device 31 for the removal of the finished brushes and for transferring, for example, to a packaging device.

In FIGS. 16 to 23, the sequence is shown how a head-side overmolding 6 is attached to the carrier part 3 of a brush pre-form 32.

A brush pre-form 32 with a carrier part 3 and a set of bristles 4 was already provided above in a conventional way with a handle 5 in the illustrated diagram. This formed handle 5, however, does not have to be provided. In particular, for reasons of space, the forming of the handle could be carried out after the attachment of the head-side overmolding 6.

In FIG. 16, the brush pre-form 32 is fed to a mold part 33 with a passage 13, wherein the passage 13 is arranged in an insertion and removal position with enlarged opening cross section. This allows the passage of the carrier part 3 with the anti-twist mechanism 8 constructed as an eyelet.

According to FIG. 17, the passage 13 of the mold part 33 is brought into the injection position with reduced opening cross section and according to FIG. 18, the brush pre-form 32 is moved forward until the sealing element 7 located at the end of the set of bristles 4 is located at the passage 13. Cavities between the wire sections 2 of the carrier part 3 and also between the carrier part 3 and the passage 13 are sealed in this way. In FIG. 19, the second mold part 34 has been fed to an injection molding mold and the end of the carrier part 3 to be injection molded is arranged in the mold cavity 36 formed in this way. By use of a feed channel 35, plastic material is introduced into the mold cavity 36 and the head-side end area of the brush pre-form 32 is injection molded (FIG. 20).

After the removal of the mold part 34 (FIG. 21) and the opening of the mold part 33 having the passage 13 (FIG. 22), the completed brush 1 with the head-side overmolding 6 can be removed (FIG. 23).

During the injection of the head-side overmolding 6, processing can be carried out at a high injection pressure, because the passage 13 is reliably sealed by the sealing element 7, independent of dimensional fluctuations and tolerances and the cavities in the area of the wire sections 2 twisted with each other are also reliably sealed. A discharge of injection material through the passage 13 is prevented by the sealing element 7. In this way, the retaining force of the plastic material of the overmolding 6 on the carrier part 3 is also improved.

The invention claimed is:

1. A brush comprising a twisted carrier part (3) made from wire sections (2) with a set of bristles (4) and at least one of a handle-side or a head-side overmolding (5, 6), a sealing element (7) is provided on an end region of at least one of the handle-side or the head-side overmolding (6) turned toward the set of bristles (4), the sealing element is adapted to seal mold cavities for the overmolding in an area of the twisted carrier part and to seal between the wire sections, and the sealing element (7) is a sealing ring that has a conical end region (11) with run-on bevels (12) spreading in a direction toward the set of bristles (4) from an end turned toward the overmolding (6).

2. The brush according to claim 1, wherein the sealing element (7) is formed by shortened bristle filaments, is a sealing band attached to the carrier part (3) or a sealing ring, or is formed by lacquer deposited on the carrier part (3).

3. The brush according to claim 1, wherein the sealing ring has, on an inside of a passage opening (10) therethrough for the carrier part (3), a transition region (16) widening in a direction toward the set of bristles (4).

4. A brush comprising a twisted carrier part (3) made from wire sections (2) with a set of bristles (4) and at least one of a handle-side or a head-side overmolding (5, 6), a sealing element (7) is provided on an end region of at least one of the handle-side or the head-side overmolding (6) turned toward the set of bristles (4), the sealing element is adapted to seal mold cavities for the overmolding in an area of the twisted carrier part and to seal between the wire sections, and the sealing element (7) is a sealing ring and has, on an outside thereof, a conical section (14) tapering in a direction toward the set of bristles (4).

5. The brush according to claim 4, wherein the wire sections (2) of at least one of the carrier part (3) or the sealing element (7) are provided with a coating for an optimized connection to injection material of the overmolding (6).

6. The brush according to claim 4, the head-side overmolding (6) has a brush-like construction.

7. A brush comprising a twisted carrier part (3) made from wire sections (2) with a set of bristles (4) and at least one of a handle-side or a head-side overmolding (5, 6), a sealing element (7) is provided on an end region of at least one of the handle-side or the head-side overmolding (6) turned toward the set of bristles (4), the sealing element is adapted to seal mold cavities for the overmolding in an area of the twisted carrier part and to seal between the wire sections, and in the insert-molded region of the carrier part (3), an anti-twist mechanism (8) is provided that is formed by an eyelet-shaped bending of the wire sections (2).

8. The brush according to claim 7, wherein the anti-twist mechanism (8) is formed by bristle filaments twisted between the wire sections (2).

* * * * *